United States Patent
Bang et al.

(10) Patent No.: US 9,093,838 B2
(45) Date of Patent: Jul. 28, 2015

(54) FAULT CURRENT DETECTING CIRCUIT

(71) Applicant: LSIS CO., LTD., Anyang-si, Gyeonggi-do (KR)

(72) Inventors: Seung Hyun Bang, Daejeon (KR); Hae Yong Park, Changwon-si (KR); Gyeong Ho Lee, Cheongju-si (KR); Jung Wook Sim, Cheongju-si (KR); Won Joon Choe, Cheongju-si (KR); Min Jee Kim, Cheongju-si (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 160 days.

(21) Appl. No.: 14/051,269

(22) Filed: Oct. 10, 2013

(65) Prior Publication Data
US 2014/0118001 A1    May 1, 2014

(30) Foreign Application Priority Data

Oct. 30, 2012   (KR) .......................... 10-2012-0121510

(51) Int. Cl.
| G01R 31/02 | (2006.01) |
| H02H 3/44 | (2006.01) |
| H02H 3/093 | (2006.01) |
| H02H 9/02 | (2006.01) |

(52) U.S. Cl.
CPC ................. *H02H 3/44* (2013.01); *H02H 3/093* (2013.01); *H02H 9/02* (2013.01)

(58) Field of Classification Search
CPC ............ H02H 3/093; H02H 3/44; H02H 9/02
USPC ............ 324/71, 378, 403, 415, 425, 500, 537
See application file for complete search history.

(56) References Cited

U.S. PATENT DOCUMENTS

| 5,361,184 A | 11/1994 | El-Sharkawi et al. |
| 6,426,856 B1 | 7/2002 | Schneerson et al. |

(Continued)

FOREIGN PATENT DOCUMENTS

JP       2002-095149       3/2002

OTHER PUBLICATIONS

European Patent Office Application Serial No. 13188423.1, Search Report dated Feb. 21, 2014, 6 pages.

(Continued)

*Primary Examiner* — Jermele M Hollington
*Assistant Examiner* — Raul Rios Russo
(74) *Attorney, Agent, or Firm* — Lee, Hong, Degerman, Kang & Waimey

(57) ABSTRACT

The fault current detecting circuit includes: a current detection unit that outputs a current detection signal; a first comparing circuit unit that compares the current detection signal with a predetermined reference current value and outputs a first output signal; a differentiator that differentiates the current detection signal to output a change slope of the current detection signal; a second comparing circuit unit that compares the change slope with a predetermined reference change slope value and outputs a second output signal; a third comparing circuit unit that compares the current detection signal with a predetermined current detection limit reference value and output a third output signal; and a trip determining unit that outputs a trip control signal only when the first output signal and the second output signal are maintained to be received and the third output signal is not received.

3 Claims, 5 Drawing Sheets

(56) References Cited

U.S. PATENT DOCUMENTS

2010/0208403 A1* 8/2010 Das et al. ............... 361/94
2012/0056637 A1   3/2012 Jeong et al.
2013/0082179 A1* 4/2013 Fukui et al. ............. 250/338.3

OTHER PUBLICATIONS

Japan Patent Office Application Serial No. 2013-215577, Office Action dated Sep. 2, 2014, 2 pages.

* cited by examiner

FAULT CURRENT DETECTING CIRCUIT

CROSS-REFERENCE TO RELATED APPLICATION

Pursuant to 35 U.S.C. §119(a), this application claims the benefit of earlier filing date and right of priority to Korean Application No. 10-2012-0121510, filed on Oct. 30, 2012, the contents of which is incorporated by reference herein in its entirety.

BACKGROUND OF THE INVENTION

1. Field of the Invention

The present disclosure relates to a circuit breaker or a fault current limiter, and particularly, to a fault current detecting circuit capable of promptly and accurately detecting a fault current generated in an electric circuit in an electric power system and outputting a trip control signal.

2. Background of the Invention

A circuit breaker, or a fault current limiter, is a power device installed to be connected to an electric circuit in an electric power system (hereinafter, referred to as a 'circuit') to detect a fault current such as an overcurrent or a short-circuit current occurring in the circuit to trip. When a fault current is detected, the circuit breaker is tripped (i.e., the circuit breaker automatically breaks the circuit) or limits a current.

The present invention relates to a fault current detecting circuit capable of promptly detecting a generated fault current in a circuit and preventing malfunction when a surge is generated, thus enhancing fault current detection reliability and speed, in a circuit breaker or a fault current limiter.

A circuit configuration and operation of a related art fault current detecting circuit will be described with reference to FIGS. 1 and 2.

First, a configuration of the related art fault current detecting circuit will be described with reference to FIGS. 1 and 2.

The related art fault current detecting circuit includes a current detection unit 200, a differentiator 400, a first comparing circuit unit 300, a second comparing circuit unit 500, and a trip determining unit 600.

The current detection unit 200 includes a primary current transformer (abbreviated as CT hereinafter) 200a installed in an electric power circuit (abbreviated as power circuit hereinafter) CL to detect an amount of current flowing in the power circuit CL and a secondary CT 200b that receives a detection signal indicating an amount of current flowing in the power circuit CL detected by the primary CT 200a, converts the detection signal into a current detection signal (please refer to reference numeral 1-1 in FIG. 2) as a small current signal, and outputs the same.

The differentiator 400 is connected to an output terminal of the current detection unit 200, differentiate the current detection signal 1-1 output from the current detection unit 200, and outputs a current variation over the lapse of time (di/dt), namely, a change slope (please refer to reference numeral 2-1 in FIG. 2) of the current detection signal 1-1.

The first comparing circuit unit 300 is connected to an output terminal of the current detection unit 200 to compare the current detection signal 1-1 output from the current detection unit 200 with a predetermined reference current value (please refer to reference numeral 1-2 in FIG. 2). When the current detection signal 1-1 is greater than or equal to the reference current value 1-2, the first comparing circuit unit 200 outputs a first output signal (please refer to reference numeral 1-3 in FIG. 2) indicating the corresponding state.

The second comparing circuit unit 500 is connected to an output terminal of the differentiator 400 to compare a change slope 2-1 from the differentiator 400 with a predetermined reference change slope value 2-2. When the change slope 2-1 is greater than or equal to the reference change slope value 2-2, the second comparing circuit unit 500 outputs a second output signal (please refer to reference numeral 2-3 in FIG. 2) indicating the corresponding state.

The trip determining unit 600 is connected to the first comparing circuit unit 300 and the second comparing circuit unit 500 to receive the first output signal 1-3 and the second output signal 2-3, and when the first output signal 1-3 and the second output signal 2-3 are maintained to be received during a predetermined sampling time (e.g., 1 millisecond), the trip determining unit 600 outputs a trip control signal 3.

Meanwhile, an operation of the related art fault current detecting circuit configured as described above will be described with reference to FIGS. 1 and 2.

While the current detection signal 1-1 output by the current detecting unit 200 and indicating an amount of current flowing in the circuit is being greater than or equal to the reference current value (please refer to reference numeral 1-2 in FIG. 2), the first comparing circuit unit 300 outputs the first output signal (please refer to reference numeral 1-3 in FIG. 2).

Also, while the change slope 2-1 of the current detection signal 1-1 provided by the differentiator 400 is being greater than or equal to the reference change slope value 2-2, the second comparing circuit unit 500 outputs the second output signal (please refer to reference numeral 2-3 in FIG. 2) indicating the corresponding state.

Then, the trip determining unit 600 checks whether the first output signal 1-3 and the second output signal 2-3 are maintained to be received together during one millisecond (ms) as a predetermined period of time, starting from a point in time at which the first output signal 1-3 and the second output signal 2-3 are first received simultaneously, and when the first output signal 1-3 and the second output signal 2-3 are maintained to be received together during one milliseconds, the trip determining unit 600 outputs the trip control signal 3, or otherwise, the trip determining unit 600 does not output the trip control signal 3.

Here, the trip control signal 3 is output to magnetize a trip coil of a trip mechanism (not shown) of the circuit breaker, and accordingly, a switching mechanism (not shown) performs a trip operation according to a rotation of an armature (not shown) and a rotation of a trip bar (not shown) due to the magnetization of the trip coil to separate a movable contact arm from a stationary contact arm, thus automatically breaking the circuit.

However, in the related art fault current detecting circuit as described above, although the first output signal 1-3 and the second output signal 2-3 are simultaneously received, since the trip determining unit 60 determines to output the trip control signal 3 after the lapse of one millisecond (ms), a trip control is delayed during the corresponding period of time (i.e., 1 millisecond).

Also, in the related art fault current detecting circuit as described above, when a surge signal is maintained to be input to the fault current detecting circuit during the time exceeding one millisecond, although a normal current flows in the circuit, a trip control signal is output to break the circuit, which may cause significant damage due to unnecessary power cutoff.

SUMMARY OF THE INVENTION

Therefore, an aspect of the detailed description is to provide a fault current detecting circuit capable of shortening a period of time for determining trip control and minimizing a possibility of erroneous operation with respect to a surge signal.

To achieve these and other advantages and in accordance with the purpose of this disclosure, as embodied and broadly described herein, a fault current detecting circuit comprising:

a current detection unit configured to detect a current flowing in an electric power circuit in an electric power system and output a current detection signal;

a first comparing circuit unit configured to compare the current detection signal with a predetermined reference current value and output a first output signal when the current detection signal is greater than or equal to the reference current value;

a differentiator configured to differentiate the current detection signal output from the current detection unit to output a change slope of the current detection signal;

a second comparing circuit unit configured to compare the change slope with a predetermined reference change slope value and output a second output signal when the change slope of the current detection signal is greater than or equal to the reference change slope value;

a third comparing circuit unit configured to compare the current detection signal with a predetermined current detection limit reference value and output a third output signal when the current detection signal is greater than or equal to the current detection limit reference value; and a trip determining unit connected to the first comparing circuit unit, the second comparing circuit unit, and the third comparing circuit unit to receive the first output signal, the second output signal, and the third output signal, and output a trip control signal only when the first output signal and the second output signal are maintained to be received and the third output signal is not received during a predetermined short period of time.

According to an aspect of the present invention, the predetermined short period of time may be 100 microseconds (μs).

According to an aspect of the present invention, the predetermined short period of time may be determined as a value ranging from 50 microseconds (μs) to 100 microseconds (μs).

According to an aspect of the present invention, the current detection limit reference value may be selected from within a range greater than or equal to a maximum fault current value of the electric power system and smaller than or equal to a value 140 times a rated current.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this disclosure, illustrate exemplary embodiments and together with the description serve to explain the principles of the invention.

In the drawings.

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated.

First, a configuration of a fault current detecting circuit according to an embodiment of the present invention will be described with reference to FIG. 3.

Figure 1:
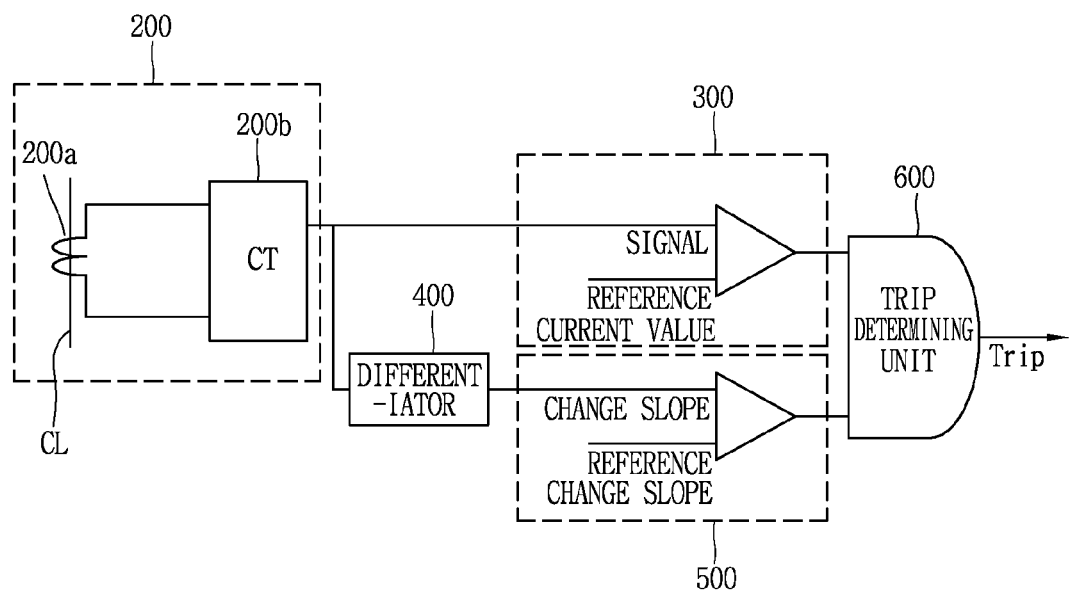
FIG. 1 is a block diagram illustrating a configuration of the related art fault current detecting circuit.
Figure 2:
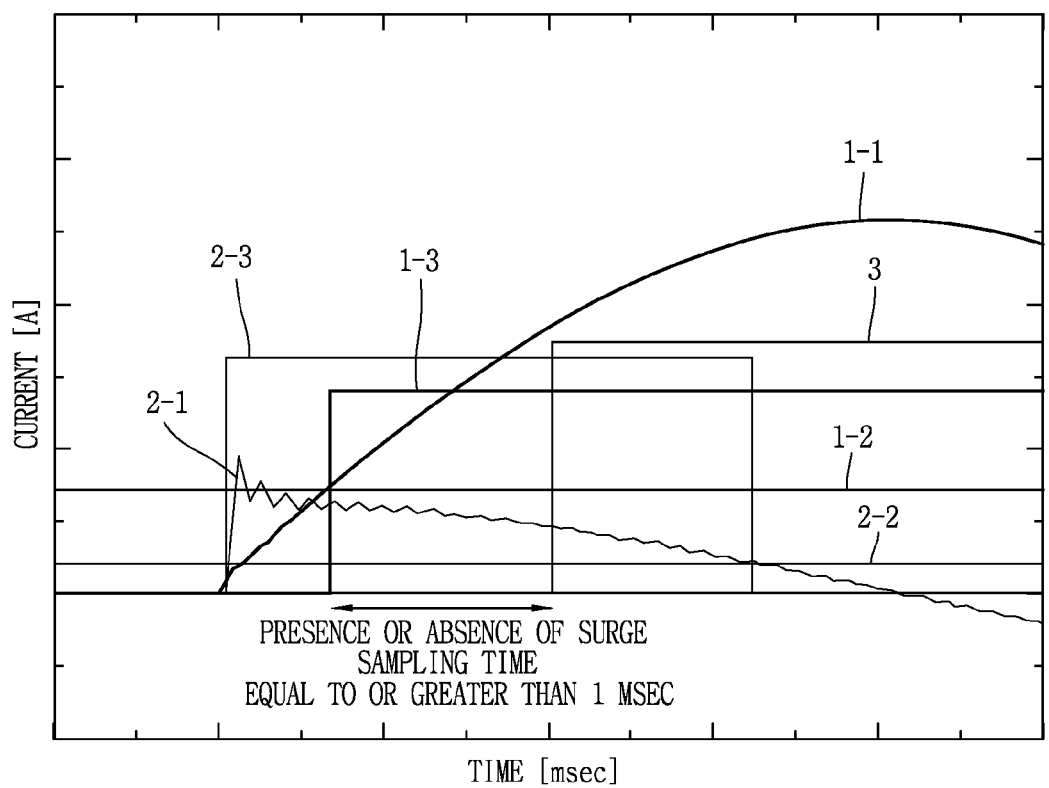
FIG. 2 is a signal waveform view illustrating operations of the related art fault current detecting circuit.
Figure 3:
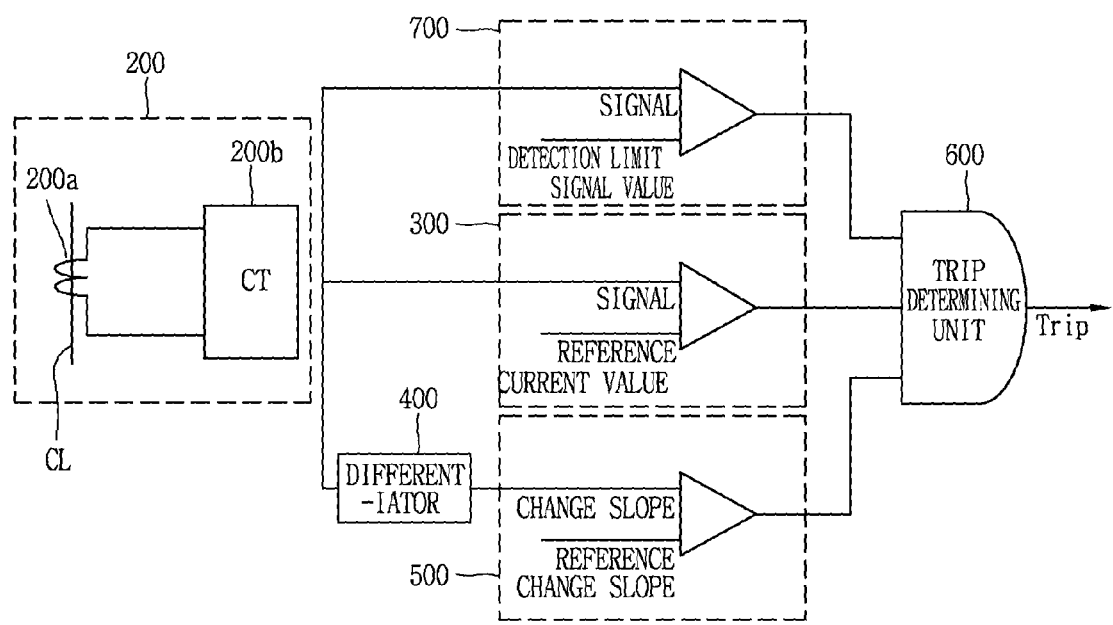
FIG. 3 is a block diagram illustrating a configuration of a fault current detecting circuit according to an embodiment of the present invention.

As can be seen with reference to FIG. 3, the fault current detecting circuit according to an embodiment of the present invention includes a current detection unit 200, a first comparing circuit unit 300, a differentiator 400, a second comparing circuit unit 500, a third comparing circuit unit 700, and a trip determining unit 600.

Here, the first comparing circuit unit 300, the differentiator 400, the second comparing circuit unit 500, the third comparing circuit unit 700, and the trip determining unit 600 may be implemented by a microprocessor and a program processed by the microprocessor in an actual product.

Figure 4:
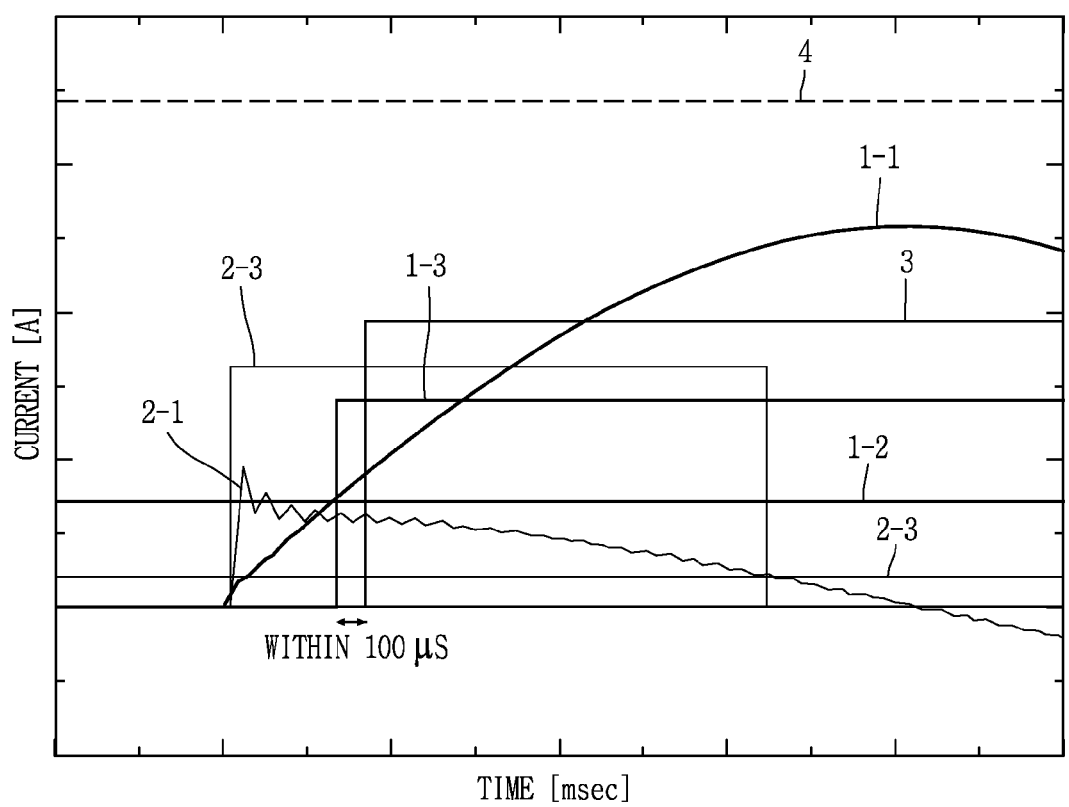
FIG. 4 is a signal waveform view illustrating operations of the fault current detecting circuit according to an embodiment of the present invention when a fault current is generated and a surge current is not generated in a circuit.
Figure 5:
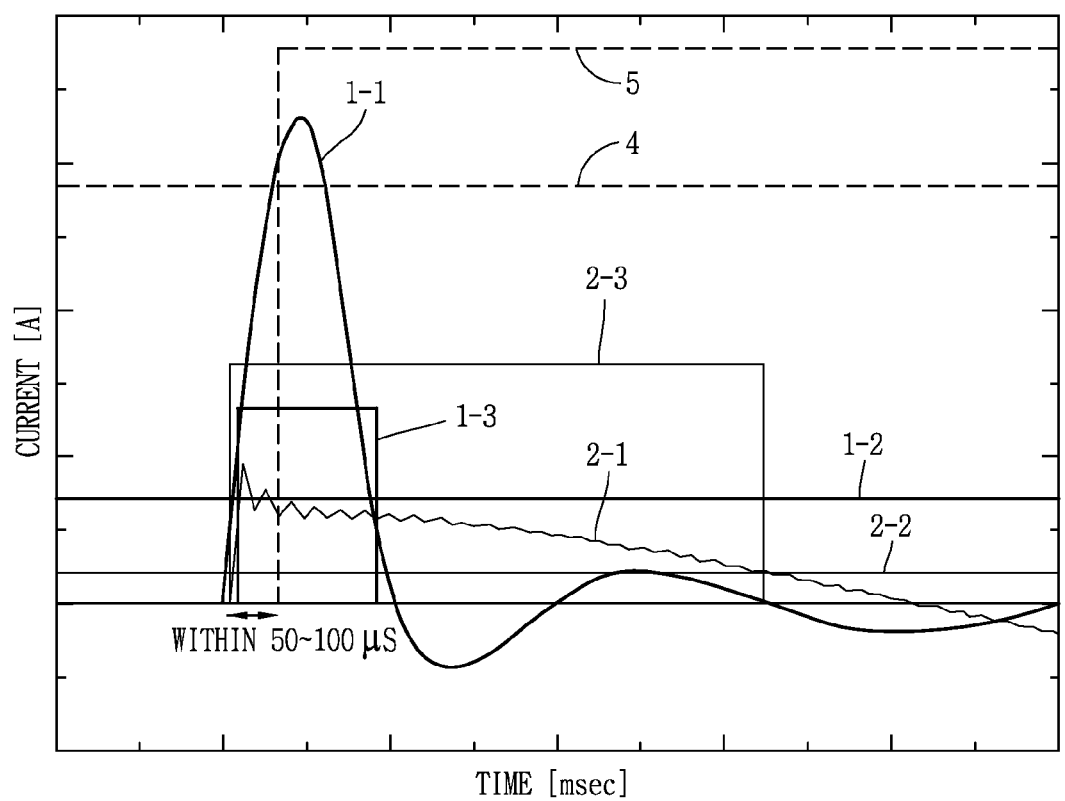
FIG. 5 is a signal waveform view illustrating operations of the fault current detecting circuit according to an embodiment of the present invention when a surge current is generated in the circuit.

The current detection unit 200 detects a current flowing in a power circuit CL of an electric power system and outputs a current detection signal (please refer to reference numeral 1-1 in FIGS. 4 and 5). The current detection unit 200 may include a first current transformer 200a that primarily detects a current flowing in the power circuit CL and outputs a primary current detection signal and a second current transformer 200b converting the primary detection current signal output from the first current transformer 200a into a current detection signal (please refer to reference numeral 1-1 in FIGS. 4 and 5) as a secondary current detection signal of a small current that may be admissible by the microprocessor.

The first comparing circuit unit 300 is connected to an output terminal of the current detection unit 200 and compares the current detection signal 1-1 output from the current detection unit 200 with a predetermined reference current value (please refer to reference numeral 1-2 in FIGS. 4 and 5). When the current detection signal 1-1 is greater than or equal to the reference current value 1-2, the first comparing circuit unit 300 outputs a first output signal (please refer to reference numeral 1-3 in FIGS. 4 and 5).

The differentiator 400 is connected to the output terminal of the current detection unit 200, differentiates the current detection signal (please refer to reference numeral 1-1 in FIGS. 4 and 5) output from the current detection unit 200, and outputs a change slope (please refer to reference numeral 2-1 in FIGS. 4 and 5) of the current detection signal.

The second comparing circuit unit 500 is connected to an output terminal of the differentiator 400 and compares the change slope (please refer to reference numeral 2-1 in FIGS. 4 and 5) of the current detection signal from the differentiator 400 with a predetermined reference change slope value (please refer to reference numeral 2-2 in FIGS. 4 and 5).

When the change slope (please refer to reference numeral 2-1 in FIGS. 4 and 5) of the current detection signal is greater than or equal to the reference change slope value (please refer to reference numeral 2-2 in FIGS. 4 and 5), the second comparing circuit unit 500 outputs a second output signal (please refer to reference numeral 2-3 in FIGS. 4 and 5).

The third comparing circuit unit 700 is connected to the output terminal of the current detection unit 200 and compares the current detection signal (please refer to reference numeral 1-1 in FIGS. 4 and 5) output from the current detection unit 200 with a predetermined current detection limit reference value (please refer to reference numeral 4 in FIGS. 4 and 5). When the current detection signal (please refer to reference numeral 1-1 in FIGS. 4 and 5) is greater than or equal to the current detection limit reference value (please refer to reference numeral 4 in FIGS. 4 and 5), the third comparing circuit unit 700 outputs a third output signal (please refer to reference numeral 5 in FIG. 5) (please refer to reference numeral 5 in FIG. 5).

The trip determining unit 600 is connected to the first comparing circuit unit 300, the second comparing circuit unit 500 and the third comparing circuit unit 700 in order to receive the first output signal (please refer to reference numeral 1-3 in FIGS. 4 and 5), the second output signal (please refer to reference numeral 2-3 in FIGS. 4 and 5), and the third output signal (please refer to reference numeral 5 in FIG. 5).

The trip determining unit 600 outputs a trip control signal (please refer to reference numeral 3 in FIG. 4) only when the first output signal (please refer to reference numeral 1-3 in FIGS. 4 and 5) and the second output (please refer to reference numeral 2-3 in FIGS. 4 and 5) are maintained to be received and the third output signal (please refer to reference numeral 5 in FIG. 5) is not received during a predetermined short period of time.

The predetermined short period of time may be a value of 100 microseconds ($\mu$s) determined in advance according to an embodiment of the present invention and stored in a memory included in, for example, a microprocessor. Here, 100 microseconds ($\mu$s) is a maximum value of time generally required for a waveform of a surge current to reach a peak value.

According to another embodiment of the present invention, the predetermined short period of time may be a value ranging from 50 microseconds ($\mu$s) to 100 microseconds ($\mu$s) determined in advance and stored in a memory included in, for example, a microprocessor. Here, the value ranging from 50 microseconds ($\mu$s) to 100 microseconds ($\mu$s) is a temporal range generally required for a waveform of a surge current to reach a peak value.

Also, the current detection limit reference value is a value selected from within a range greater than or equal to a maximum fault current value of the electric power system or smaller than or equal to a value 140 times a rated current, according to an embodiment of the present invention.

An operation of the fault current detecting circuit according to an embodiment of the present invention configured as described above will be described with reference to FIGS. 3 through 5.

During a period of time in which the current detection signal 1-1 output from the current detection unit 200 and indicating an amount of current flowing in the circuit is greater than or equal to the reference current value 1-2, the first comparing circuit unit 300 outputs the first output signal 1-3.

Also, during a period of time in which the change slope 2-1 of the current detection signal 1-1 provided from the differentiator 400 is greater than or equal to the reference change slope value 2-2, the second comparing circuit unit 500 outputs the second output signal 2-3 indicating the corresponding state.

Also, at this time, the third comparing circuit unit 700 compares the current detection signal 1-1 output from the current detection unit 200 with the predetermined current detection limit reference value 4.

According to the comparison results, when the current detection signal 1-1 corresponding to a surge signal having a value equal to or greater than the current detection limit reference value 4 does not exist, the third comparing circuit unit 700 does not output the third output signal.

According to the comparison results, when the current detection signal 1-1 is greater than or equal to the current detection limit reference value 4, the third comparing circuit unit 700 outputs the third output signal as illustrated in FIG. 5.

Then, as can be seen with reference to FIG. 4, if the first output signal 1-3 and the second output signal 2-3 are simultaneously received and the third output signal from the third comparing circuit unit 700 does not exist during a predetermined period of time of 100 microseconds ($\mu$s), starting from a point in time at which the first output signal 1-3 and the second output signal 2-3 are simultaneously received, it means that a fault current has been generated in the circuit, and thus, the trip determining unit 600 outputs the trip control signal 3.

Also, as can be seen with reference to FIG. 5, if the first output signal 1-3 and the second output signal 2-3 are simultaneously received and the third output signal is also received from the third comparing circuit unit 700 during a predetermined period of time of 100 microseconds ($\mu$s), starting from a point in time at which the first output signal 1-3 and the second output signal 2-3 are simultaneously received, it means that a surge current has been generated in the circuit, and thus, the trip determining unit 600 does not output the trip control signal 3.

Here, the trip control signal 3 is output to magnetize a trip coil of a trip mechanism (not shown) of the circuit breaker, and accordingly, a switching mechanism (not shown) performs a trip operation according to a rotation of an armature (not shown) and a rotation of a trip bar (not shown) due to the magnetization of the trip coil to separate a movable contact arm from a stationary contact arm, thus automatically breaking the circuit and protecting the circuit and a load device connected to the circuit from a fault current.

As described above, the fault current detecting circuit according to an embodiment of the present invention includes: the first comparing circuit unit 300 configured to compare the current detection signal 1-1 output from the current detection unit 200 with the predetermined reference current value 1-2, and output, when the current detection signal 1-1 is greater than or equal to the reference current value 1-2, the first output signal 1-3 indicating the corresponding state; the second comparing circuit unit 500 configured to compare the change slope 2-1 of the current detection signal 1-1 with the predetermined reference change slope value 2-2 and output, when the change slope 2-1 of the current detection signal 1-1 is greater than or equal to the reference change slope value 2-2, the second output signal 2-3 indicating the corresponding state; the third comparing circuit unit 700 configured to compare the current detection signal 1-1 output from the current detection unit 200 with the predetermined current detection limit reference value 4 and output, when the current detection signal 1-1 is greater than or equal to the current detection limit reference value 4, the third output signal 5 indicating the corresponding state; and the trip determining unit 600 configured to output the trip control signal 3 only when the first output signal 1-3 and the second output signal 2-3 are maintained to be received and the third output signal 5 is not received during the predetermined short period of time (e.g., 100 microseconds (μs)), whereby whether to promptly output the trip control signal 3 can be determined and erroneous operation due to external surge signal can be prevented.

In the fault current detecting circuit according to an embodiment of the present invention, since the predetermined short period of time is 100 microseconds (μs), whether to output the trip control signal can be promptly determined within a very short period of time.

In the fault current detecting circuit according to an embodiment of the present invention, since the predetermined short period of time is a value ranging from 50 microseconds (μs) to 100 microseconds (μs) and the corresponding range is generally a temporal range for a surge signal to reach a peak value, whether to output a trip control signal can be determined according to whether a surge signal is received during the corresponding short period of time, and thus, a trip control signal can be output promptly without erroneous operation over a surge signal.

In the fault current detecting circuit according to an embodiment of the present invention, since the current detection limit reference value is a value selected from within a range greater than or equal to a maximum fault current value of the electric power system or smaller than or equal to a value 140 times a rated current and a current value of a surge current (or a surge signal) is approximately 140 times a rated current, a surge signal can be effectively detected.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A fault current detecting circuit comprising:
   a current detection unit configured to detect a current flowing in an electric power circuit in an electric power system and output a current detection signal;
   a first comparing circuit unit configured to compare the current detection signal with a predetermined reference current value and output a first output signal when the current detection signal is greater than or equal to the reference current value;
   a differentiator configured to differentiate the current detection signal output from the current detection unit to output a change slope of the current detection signal;
   a second comparing circuit unit configured to compare the change slope with a predetermined reference change slope value and output a second output signal when the change slope of the current detection signal is greater than or equal to the reference change slope value;
   a third comparing circuit unit configured to compare the current detection signal with a predetermined current detection limit reference value and output a third output signal when the current detection signal is greater than or equal to the current detection limit reference value;
   and a trip determining unit connected to the first comparing circuit unit, the second comparing circuit unit, and the third comparing circuit unit to receive the first output signal, the second output signal, and the third output signal, and output a trip control signal only when the first output signal and the second output signal are maintained to be received and the third output signal is not received during a predetermined short period of time, wherein the predetermined short period of time is determined as a value ranging from 50 microseconds (μs) to 100 microseconds (μs).

2. The fault current detecting circuit of claim 1, wherein the predetermined short period of time is 100 microseconds (μs).

3. The fault current detecting circuit of claim 1, wherein the current detection limit reference value is selected from within a range greater than or equal to a maximum fault current value of the electric power system and smaller than or equal to a value 140 times a rated current.

* * * * *